E. G. K. ANDERSON.
SPOT LAMP.
APPLICATION FILED JULY 9, 1921.
Reissued Aug. 29, 1922.
15,437.
2 SHEETS—SHEET 1.
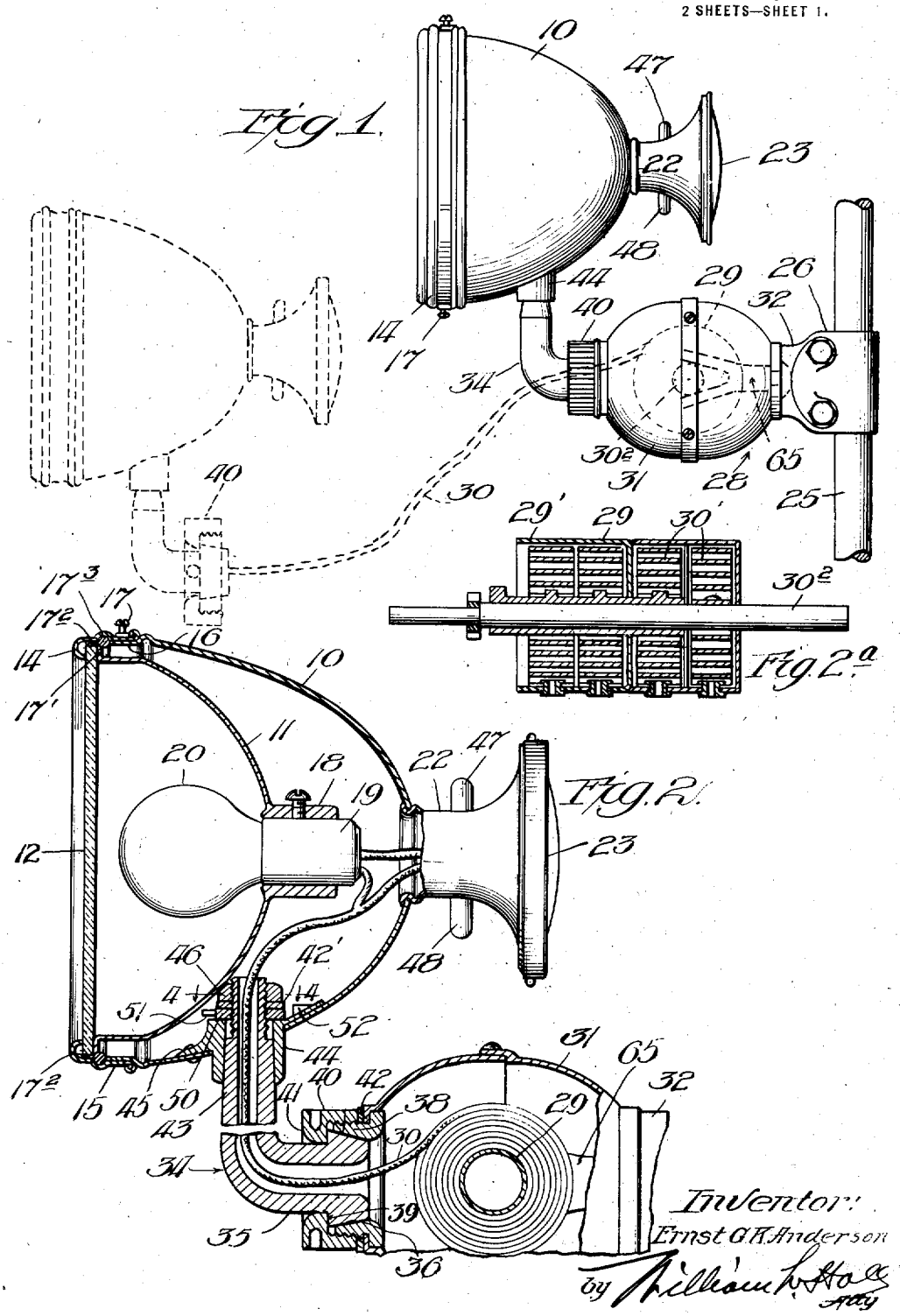

E. G. K. ANDERSON.

SPOT LAMP.

APPLICATION FILED JULY 9, 1921.

Reissued Aug. 29, 1922. 15,437.

2 SHEETS—SHEET 2.

Inventor:
Ernst G. K. Anderson
by William H. Hale
Atty

UNITED STATES PATENT OFFICE.

ERNST G. K. ANDERSON, OF CHICAGO, ILLINOIS, ASSIGNOR, BY MESNE ASSIGNMENTS, TO APPLETON ELECTRIC CO., OF CHICAGO, ILLINOIS, A CORPORATION OF ILLINOIS.

SPOT LAMP.

15,437. Specification of Reissued Letters Patent. Reissued Aug. 29, 1922.

Original No. 1,309,714, dated July 15, 1919, Serial No. 129,763, filed November 6, 1916. Application for reissue filed July 9, 1921. Serial No. 483,602.

*To all whom it may concern:*

Be it known that I, ERNST G. K. ANDERSON, a citizen of the United States, and a resident of Chicago, in the county of Cook and State of Illinois, have invented certain new and useful Improvements in Spot Lamps; and I do hereby declare that the following is a full, clear, and exact description thereof, reference being had to the accompanying drawings, and to the characters of reference marked thereon, which form a part of this specification.

The invention relates to improvements in spot and demountable trouble lamps for motor and other vehicles, boats, and the like, designed to be attached to any suitably located part of the vehicle frame, in reach of the driver, and mounted to be universally movable in all directions whereby the light rays may be directed to any point on or at the sides of the path of the vehicle.

One of the features of my invention resides in a novel combination and arrangement of a lamp of this character, combined with a take-up device for the conductor cord of the lamp, the parts being so arranged that normally the lamp is sustained on its support so that it may be manipulated in the usual manner of a spot lamp, and which is capable of being detached and withdrawn from the vehicle so as to carry the lighted lamp to any part of the vehicle within the range of the conductor cord length for use as a trouble lamp.

Another object of the invention is to provide a novel arrangement of the parts which constitute the swinging or rotating joints between the elements of the lamp and its support.

A further object of the invention is to provide a novel combined rotating and detachable joint at the point of parting of the lamp with its support.

Other objects of the invention are to improve and simplify constructions of this general character and the invention consists in the combination and arrangement of the parts shown in the drawings and described in the specification, and is pointed out in the appended claims.

In the drawings:

Figure 1 is a side elevation of a lamp and mounting embodying my invention, showing in dotted lines the lamp in its extended position.

Figure 2 is a view thereof partly in vertical section and partly in elevation.

Figure $2^a$ is an axial section of the lamp cord rewinding reel.

Figure 3:
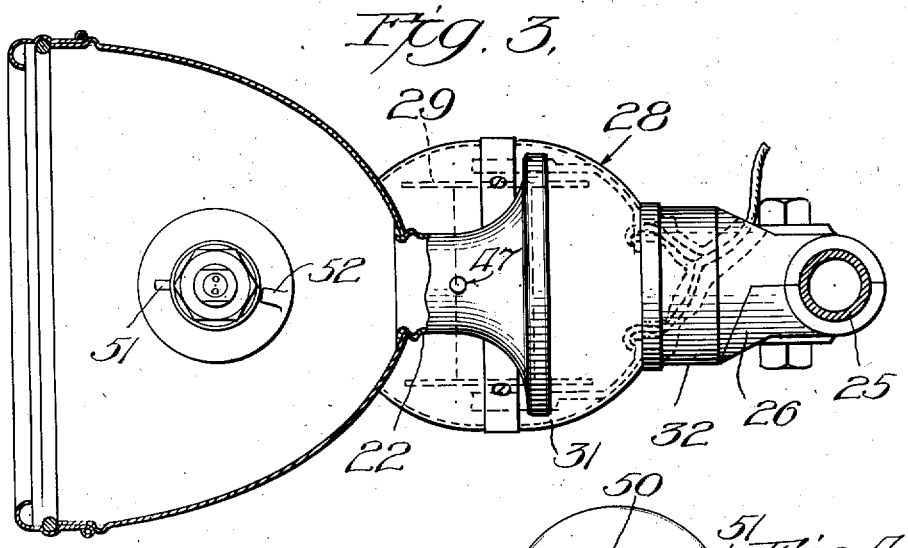

Figure 3 is a plan view of the lamp with parts in section.

Figure 4:
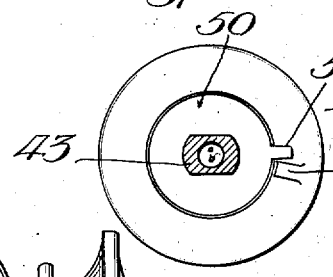

Figure 4 is an enlarged detail section on the line 4—4 of Figure 2.

Figure 5:
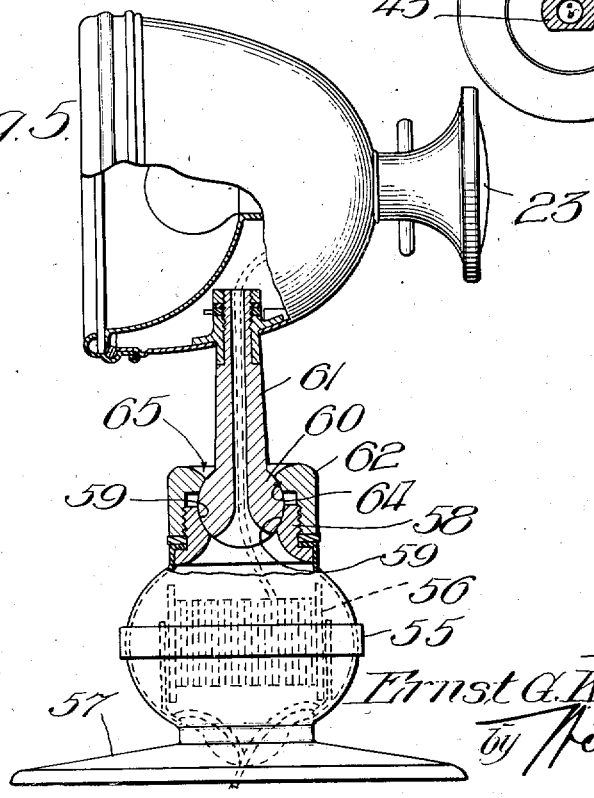

Figure 5 is a partial elevation and partial section of a modified form of lamp and mounting.

As shown in Figures 1 to 4, inclusive, of the drawings, 10 designates the lamp casing provided with the usual interior reflector 11 and with a lens 12 which extends across the open front of the casing. Said lens is supported against an inturned flanged rim 14 of a lens holding ring 15 that is fitted over the cylindric open end of the casing and is attached thereto by screws 17. The front end of the reflector is provided with a radial flange 17′, which terminates in a cylindric flange $17^2$ that embraces the periphery of the lens. The flange 17′ fits flat against the lens at its marginal portion and said reflector and lens are held in place by means of a split spring $17^3$ which lies partially in an annular groove of the lens locking ring and engages the rear face of the flange 17′. The reflector is provided with sleeve 18 to receive the socket 19 of the lamp 20. In the present instance the lamp body or casing terminates in a central, rearwardly directed hollow neck portion 22 which carries at its rear flared end a reducing mirror 23.

The lamp, when adapted to a motor vehicle, may be attached to one of the posts 25 of the wind shield frame by a support which comprises members to permit angular adjustment and detachment of the lamp casing and for carrying the take-up reel of a lamp cord, whereby the lamp casing is capable of being manipulated in the manner of a spot lamp and may be withdrawn from the part of the vehicle on which it is supported to serve as a trouble lamp and for other uses within the range of the lamp cord length. A practical form of this support (by which may be meant the parts of the support for the lamp casing by which it is attached to the vehicle that function to permit of such angular adjustment and detachment and which carries the lamp cord take-up reel) is herein shown, although such bracket may take other structural forms within the spirit of the invention and adapted to the general functions set forth.

As shown, the support, designated as a whole by 28, embraces in its structure a fixed bracket member 31 to support the take-up reel 29 of the lamp cord 30 and an L-shaped movable and removable lamp supporting member 34 that is mounted at one end in the bracket member 31 for angular adjustment in one plane and is provided at its other end with a bearing for the lamp casing on which said casing may be angularly adjusted in another plane. The supporting bracket may be attached to the wind shield frame by a clamp 26 that may be made part of or attached to a neck portion 32 of said member 31. In the present construction the bracket member 31 has the form of a casing to receive and inclose the cord take-up reel 29. Said casing is preferably made of two sheet metal parts to permit the reel to be inserted into and removed from the casing. The reel 29 may be of the construction shown in my prior United States Letters Patent Number 1,175,498, dated March 14, 1916, and illustrated in Figures 1, $2^a$, 3, and 5 of the drawings. Said reel embraces a rewinding spring comprising a number of sidewise disposed coil springs 30′ that are connected as a series to a casing 29′ and a shaft $30^2$ in a manner to act as a single spring. This construction of reel is advantageous inasmuch as it is compact and has a wide range to adapt it to long lamp cords, and its resistance to withdrawal of the cord is substantially uniform throughout its range of action. It also permits the casing 31 to be made within the proper limits of dimensions.

One end, the shorter end 35, of said L-shaped fitting 34 is provided with an exteriorly tapered portion 36 which fits in an interiorly tapered bushing 38, which is attached in any suitable manner to the casing opposite the neck 32. Said portion 35 of the fitting is provided just outside of its taper 36 with an annular outwardly facing shoulder 39 which is located in a plane exterior to the end face of the bushing 38. 40 designates a nut which is internally threaded to engage exterior threads on the bushing 38 and is provided with a radial annular flange 41 to engage over the annular shoulder 39. When said nut is screwed home the flange 41 acts on the shoulder 39 to force the tapered portions 36 and 38 into frictional contact to prevent normal angular movement of one part on the other. If desired, a spring washer 42 may be interposed between said nut and casing to afford a yielding friction joint and to also aid in locking the nut in place. This contact of the tapers, however, is such as to permit the fitting 34 and the lamp carried thereby to be angularly adjusted about the axis of the bushing 38 when moderate force is applied, and the taper bearings are of such character (as one being made of brass and the other of steel) as to withstand such relative frictional movements without substantial wear.

The other or upright arm 43 of the fitting 34 extends through a bushing 44 that is fitted in a suitable opening of the lower side of the sheet metal lamp body or casing and may be attached thereto in any suitable manner, as by rivets extending through a flange 45 of said bushing and the sheet metal lamp body around said opening. Said arm 43 of the fitting is tapered to engage an interior taper of the bushing 44, and the extreme end of said arm 43 is screw threaded within the lamp body to receive a nut 46 which serves to force the tapered portions of the bushing 44 and arm 43 into frictional contact. Preferably a yielding washer 42′ and a washer 50 are interposed between said nut 46 and the flat upper end face of the bushing 44 to produce a yielding frictional tapered joint and to also lock the nut in place. The frictional engagement between the tapered parts is such as to normally hold the lamp body from turning about the axis of the arm 43 of the fitting 34, but permits angular adjustment of said parts by a moderate pressure applied to the lamp.

The fitting 34 is preferably made hollow to afford a conduit through which extends the lamp or conductor cord 30. As herein shown, one side of the lamp circuit includes a switch located in the neck 22 and which may be of any siutable or preferred form, and said switch is actuated by upper and lower push buttons 47, 48 in a familiar manner not necessary to be specifically illustrated.

In order to avoid twisting of the conductor cord, which would occur by turning the lamp about the axis of the bushing 44 an indefinite number of times in one direction, I have provided a stop, which limits the turning movement of the lamp body, while permitting it to turn substantially throughout the range of an entire circle. This may be accomplished by flattening the threaded portion of the arm 43 of the fitting 34 and fitting thereover the washer 50 having an opening to interlockingly fit on the flattened portion of said fitting so as to turn therewith. The said washer is provided with a short radial arm or stud 51, which is adapted to engage a stop lug 52 on the bushing 44 or its flange.

From the foregoing description it will be apparent that the construction is so arranged as to normally function as a universally adjustable spot lamp; the tapered joints between the two arms of the fitting 34 and the bushings 38 and 44, respectively, giving a practically universal adjustment to the lamp. When it is desired to extend the lamp away from its position of support on the vehicle in order to use it as a trouble lamp or for other purposes, the nut 40 is removed from the bushing 38 so as to permit the lamp and the fitting 34 to be moved away from the bracket member in the manner indicated in dotted lines in Figure 1. The conductor 30 will in practice be made of a length to correspond to the requirements of its particular use. When used on an automobile, it will be made long enough for the lamp, when extended, to reach to any part of the vehicle.

In Figure 5, is shown a construction more particularly adapted to use on a boat, or other location where the lamp is to be supported on an upwardly facing surface. In this construction 55 designates a two part casing to contain the reel indicated in dotted lines by 56 and said casing is provided with a wide base 57 by which it may be secured to a flat support in fixed position thereon. The casing is provided at its upper end with an exteriorly screw threaded bushing 58, which is formed with a spherical segmental seat 59 to receive the spherical end 60 of a lamp supporting fitting 61 to the upper end of which may be attached the lamp body 10 in the same manner as described in connection with the previous figures. 62 designates an interiorly threaded nut which is threaded over the bushing 58 and which is centrally apertured to permit the fitting 61 to pass therethrough. It is provided with an internal spherical segmental bearing surface 64 to bear against the lower spherical end of the fitting 61 and to constitute, in connection with the spherical segmental bearing portion 59 of said bushing, a socket to receive the ball or spherical end of said fitting. The clamping pressure exerted by the nut 62 serves to normally hold the parts in any adjustment given thereto, while permitting angular adjustment of said fitting 61 and the lamp carried thereby when desired. The said nut is provided around its opening through which the fitting extends, with a flaring clearance space 65 to permit an extended angular adjustment of the fitting relatively to the nut 62.

The combination shown, embracing the dirigible or universally adjustable or directable and demountable spot lamp, and the reel means employed for taking up the slack of a conductor cord which is capable of maintaining the lamp in circuit with a source of current at all times, as through the cord supporting reel and the wipers 65 provides a very unique and convenient appliance that combines the functions of a universal spot lamp and demountable trouble lamp which is capable of different adaptations as a combination and which retains without reduction in efficiency the individual functions of the individual device. It will be understood that the structural details of the illustrated embodiments of the invention are capable of variation within the spirit and scope of the claims hereto appended.

I claim as my invention:

1. A vehicle spot and trouble lamp comprising, in combination, a lamp casing, a take-up reel for a lamp cord and a support for said lamp casing and said take-up reel, having means of attachment to a vehicle, said support embracing means to permit both universal angular adjustment and detachment of the lamp casing relatively to the take-up reel.

2. A vehicle spot and trouble lamp comprising, in combination, a lamp casing, a rewinding reel for a lamp cord, a supporting device having means of attachment to a vehicle at one end thereof, and separate means to sustain said lamp casing and said rewinding reel on said supporting device with the reel between the lamp casing and vehicle, said supporting device embracing a separable joint whereby the lamp casing may be moved away from the rewinding reel.

3. A spot lamp comprising a lamp casing, a bracket member therefor, a universal joint between the bracket member and casing, a detachable connection between said bracket member and casing, a cord take-up reel and a lamp conductor cord windable on said reel.

4. A spot lamp comprising a lamp casing, a bracket member, a reel carried by said bracket member, an angular fitting, one arm of which is rotatively connected to the casing and the other of which is rotatively connected to the bracket member, means to detachably connect said fitting to the bracket member and a lamp cord windable on said reel.

5. A spot lamp comprising a lamp casing, a bracket member, a reel carried by said bracket member, an angular fitting, one arm of which is rotatively connected to the casing and the other of which is rotatively connected to the bracket member, means to detachably connect said fitting to the bracket member, and a lamp cord windable on said reel, said fitting being hollow and the cord extending from the bracket member to the casing through said hollow fitting.

6. A universally adjustable spot lamp comprising a lamp casing, a fixed bracket member on which it is sustained, a movable bracket member between said casing and said fixed bracket member including pivots constructed to permit universal adjustment of the lamp relatively to the fixed bracket member, a separable joint between the fixed and movable bracket members to permit the lamp casing to be moved away from the fixed bracket member, and a take-up reel for a lamp conductor cord mounted on the fixed bracket member and relatively to which the lamp casing is universally adjustable.

7. A vehicle lamp comprising, in combination, a lamp casing, a take-up reel for a lamp cord, a mounting support for the lamp casing having means of attachment to a vehicle and supporting a casing to inclose and support said take-up reel, said support embracing also a separable supporting connection at said take-up reel casing, and constructed with means to permit both vertical and horizontal movements of the lamp casing relatively to the take-up reel casing.

8. A vehicle lamp comprising, in combination, a lamp casing, a take-up device for a lamp cord, a mounting support for the lamp casing having means of attachment to a vehicle and embracing a fixed casing to enclose and support said take-up device, said support embracing also a member having a rotative, separable joint at said take-up device casing, and provided at its outer end with a lamp casing bearing constructed with means to permit the lamp casing supported thereon to swing in a plane at a right angle to the plane of rotation of said joint.

In testimony whereof I claim the foregoing as my invention, I hereunto append my signature at Chicago, Illinois, this sixth day of July, 1921.

ERNST G. K. ANDERSON.